United States Patent [19]  [11] Patent Number: 5,076,676
Saito  [45] Date of Patent: Dec. 31, 1991

[54] OBJECTIVE LENS SYSTEM FOR MICROSCOPES

[75] Inventor: Yoshiharu Saito, Tokyo, Japan

[73] Assignee: Olympus Optical Co., Ltd., Tokyo, Japan

[21] Appl. No.: 619,924

[22] Filed: Nov. 27, 1990

[51] Int. Cl.$^5$ .............................................. G02B 21/02
[52] U.S. Cl. .................................................... 359/656
[58] Field of Search ............................... 350/414, 463

[56] References Cited

U.S. PATENT DOCUMENTS 4,588,264  5/1986  Shimizu ............................... 350/414

FOREIGN PATENT DOCUMENTS

59-100409  6/1984  Japan.
60-205521 10/1985  Japan.
60-247613 12/1985  Japan.
61-30245   7/1986  Japan.

Primary Examiner—Bruce Y. Arnold
Assistant Examiner—Rebecca D. Gass
Attorney, Agent, or Firm—Cushman, Darby & Cushman

[57] ABSTRACT

An objective lens system for microscopes comprising, in the order from the object side, a first lens unit which has a positive refractive power, comprises a positive meniscus lens component having a convex surface on the image side and allows a diverging light bundle to emerge therefrom, a second lens unit which has a positive refractive power, comprises at least one cemented surface having a negative refractive power and is movable along the optical axis, and a third lens unit having a negative refractive power, and adapted so as to favorably correct aberrations by moving the second lens unit in conjunction with thickness of a transparent plane parallel plate arranged between the first lens unit and an object to be observed through the objective lens system. This objective lens system has a high magnification, a large NA and a long working distance.

9 Claims, 11 Drawing Sheets

OBJECTIVE LENS SYSTEM FOR MICROSCOPES

BACKGROUND OF THE INVENTION a) Field of the invention

The present invention relates to an objective lens system for microscopes, and more specifically to an objective lens system for microscopes which is adapted so as to be capable of favorably correcting aberrations produced by variations of thickness of transparent plane parallel plates (cover glass plates).

b) Description of the prior art

An objective lens system is generally designed on an assumption that a cover glass plate having constant thickness is to be used therewith. Accordingly, a variation of the thickness of the cover glass plate degrades imaging performance of the objective lens system and the degradation becomes more remarkable as the objective lens system has a large numerical aperture. In order to correct the degradation of the imaging performance, the objective lens system is displaced as a whole so as to maintain the height of the ray incident on the first lens component of the lens system substantially constant by slightly varying the airspace reserved between the cover glass plate and the first lens component.

In the recent years, remarkable progresses have been made in the biotechnological fields such as cultivation of cells and handling of genes. The cultivation dishes made of glass and plastic materials which are used for researches in these fields have bottom plates various in thickness thereof. Since objects contained in the cultivation dishes are observed through a microscope in these fields, the variations in thickness of the cultivation dishes (transparent plane parallel plates) aggravate aberrations in the objective lens system. Therefore, there is a demand for an objective lens system for microscopes which has a mechanism for correcting the aggravation of the aberrations and a working distance long enough to make the objective lens system usable regardless of the variations of the thickness of the plane parallel plates. As an objective lens system for microscopes which satisfies this demand, Japanese Patent Kokoku Publication No. Sho 61-30245 discloses a lens system. This conventional example is an objective lens system for microscopes which is capable of correcting aberrations within a variation range of thickness of cover glass plates (transparent plane parallel plates) from 0 to 2 mm and has a long working distance.

Further, there are known, as objective lens systems for microscopes having high magnifications and large numerical apertures, the lens systems disclosed by Japanese Patent Kokai Publication No. Sho 59-100409, No. Sho 60-205521 and No. Sho 60-247613. These conventional examples are capable of correcting aberrations only within narrow variation ranges of thickness of cover glass plates, but have long working distances.

The objective lens system for microscopes disclosed by Japanese Patent Kokoku Publication No. Sho 61-30245 has a magnification of approximately ×40 and an numerical aperture smaller than 0.6, and is capable of correcting aberrations relatively favorably within the entire variation range of thickness of cover glass plates.

Out of the conventional examples described above, the objective lens systems for microscopes disclosed by Japanese Patents Kokai Publication No. Sho 59-100409, No. Sho 60-25521 and No. Sho 60-247613 have high magnifications and large numerical apertures, but is incapable of sufficiently correcting spherical aberration and coma which are produced due to variations of thickness of cover glass plates. Especially, the objective lens system disclosed by Japanese Patent Kokai Publication No. Sho 60-247613 which has an numerical aperture of 0.8 and a magnification of approximately ×100 allows curvature of spherical aberration curve and chromatic aberration curve as well as aggravation of coma at boundaries of the variation range of thickness of cultivation dishes, and can hardly correct the curvature and aberration.

SUMMARY OF THE INVENTION

A primary object of the present invention is to provide an objective lens system for microscopes which has a high magnification, a large NA and a long working distance, and is capable of correcting aberrations favorably over an entire range within which thickness of transparent plane parallel plates such as cover glass plates is to be varied.

The objective lens system for microscopes according to the present invention comprises a first lens unit $G_1$ which has a positive refractive power, comprises a positive meniscus lens component having a convex surface on the image side and allows a diverging light bundle to emerge therefrom, a second lens unit $G_2$ which has a positive refractive power, comprises at least one cemented surface having a negative refractive power and is movable along the optical axis, and a third lens unit $G_3$ having a negative refractive power, and is adapted in such a manner that said second lens unit is moved along the optical axis relative to the first lens unit and the third lens unit in conjunction with thickness of a transparent plane parallel plate arranged between said first lens unit and an object to be observed.

In an objective lens system for microscopes, it is general to move lens units thereof for correcting aberrations produced due to variations of thickness of cover glass plates used therewith. However, in an objective lens system having a large numerical aperture wherein aberrations, especially spherical aberration, coma and chromatic aberration, are varied remarkably, it is impossible to correct the remarkable aberrations produced in the lens system as a whole including the cover glass plate unless the fixed and movable lens units composing the lens system so as to produce aberrations in reduced amounts.

In the objective lens system for microscopes according to the present invention, the first lens unit $G_1$ which has the positive refractive power undercorrects spherical aberration and chromatic aberration but, aberrations are produce in small amounts by the first lens unit $G_1$ as a whole, since it allows a diverging light bundle to emerge therefrom. The second lens unit $G_2$ has the positive refractive power which is a little weaker than that of the first lens unit $G_1$, and comprises the cemented surface which rather overcorrects the spherical aberration and chromatic aberration produced by the second lens unit $G_2$ as a whole so as to cancel the aberrations produced by the first lens unit $G_1$.

When the cover glass plate becomes thicker, the cover glass plate allows higher rays to emerge therefrom, and the surface of the cover glass plate produces aberrations and chromatic aberration in larger amounts in the diverging direction. In this case, since the rays are incident on higher portions of the first lens unit $G_1$ and the converging function of the first lens unit $G_1$ is stronger for the rays, the aberrations are increased in the direction reverse to that of the aberrations produced by the cover glass plate. However, since variations of the aberrations produced by the first lens unit $G_1$ are small, the first lens unit $G_1$ cannot correct sufficiently the variations of the aberrations produced by the cover glass plate. Therefore, the airspace reserved between the first lens unit $G_1$ and the second lens unit $G_2$ is narrowed to lower height of the rays incident on the second lens unit $G_2$ and reduce the aberrations produced in the diverging direction by the second lens unit $G_2$, thereby reducing aberrations in the objective lens system as a whole. When the cover glass plate becomes thinner, in contrast, the airspace reserved between the first lens unit $G_1$ and the second lens unit $G_2$ is widened so as to enhance the rays incident on the second lens unit $G_2$ and increase the aberrations produced in the diverging direction by the second lens unit $G_2$, thereby compensating for the aberrations in the diverging direction which are reduced due to the variations of the thickness of the cover glass plates or balancing the aberrations in the objective lens system as a whole.

The third lens unit $G_3$ has the negative refractive power and a small Petzval's sum, and functions to correct the longitudinal chromatic aberration and lateral chromatic aberration. This third lens unit $G_3$ produces, like the first lens unit $G_1$ and the second lens unit $G_2$, small amounts of aberrations which are varied little due to the variation of the cover glass plate.

In order to correct the variations of aberrations in the objective lens system caused due to the variations of the thickness of the cover glass plates, the second lens unit $G_2$ is moved relatively to the first lens unit $G_1$ and the third lens unit $G_3$ as described above. Further, in order to reduce the negative spherical aberration produced by the first lens unit $G_1$, the light bundle is diverged between the first lens unit $G_1$ and the second lens unit $G_2$. For this purpose, it is desirable to select a radius of curvature $r_i$ satisfying the following condition (1) or (2) for the most image side surface of the first lens unit $G_1$:

$$|r_i|/f < 50 \text{ (for } r_i < 0) \tag{1}$$

$$r_i/f > 6.5 \text{ (for } r_i > 0) \tag{2}$$

wherein the reference symbol $f$ represents the focal length of the objective lens system as a whole.

If $|r_i|$ is smaller than the limit defined by the condition (1), the rays travelling from the image side surface of the first lens unit $G_1$ to the second lens unit $G_2$ will have weaker divergence. That is to say, the first lens unit $G_1$ will exhibit a strengthened converging function, and produce spherical aberration, coma and chromatic aberration in larger amounts. Accordingly, it will be impossible to correct the aberrations produced due to the variations of the thickness of the cover glass plates simply by moving the second lens unit $G_2$.

If $|r_i|$ is smaller than the limit defined by the condition (2), the rays travelling from the image side surface of the first lens unit $G_1$ to the second lens unit $G_2$ will have too strong divergence and the heights of the rays incident on the second lens unit $G_2$ will be varied remarkably by moving the second lens unit $G_2$ along with the variation of the thickness of the cover glass plate. Accordingly, the aberrations, especially chromatic aberration, produced by the second lens unit $G_2$ will be varied remarkably, thereby making it impossible to obtain sufficiently favorable performance of the objective lens system.

It is possible to correct aberrations more favorably in the objective lens system for microscopes according to the present invention by designing the first lens unit $G_1$ and the second lens unit $G_2$ so as to satisfy the following conditions (3) and (4):

$$2 < f_1/f < 6 \tag{3}$$

$$4 < f_2/f < 10 \tag{4}$$

wherein the reference symbols $f_1$ and $f_2$ represent the focal lengths of the first lens unit $G_1$ and the second lens unit $G_2$ respectively.

If the lower limit of the condition (3) is exceeded, the first lens unit $G_1$ will have too strong a converging function and produce aberrations in large amounts, thereby making it impossible to correct sufficiently the spherical aberration, coma and chromatic aberration varied due to the variation of the thickness of the cover glass plate simply by moving the second lens unit $G_2$. In addition, the objective lens system will have a shortened working distance. If the upper limit of the condition (3) is exceeded, the first lens unit $G_1$ will have a weakened converging function, and the spherical aberration and chromatic aberration must be corrected by the second lens unit $G_2$ and the third lens unit $G_3$, but the rays incident on the second lens unit $G_2$ will be enhanced, thereby making it difficult to correct the variations of aberrations, especially that of chromatic aberration, caused by the variation of the thickness of the cover glass plate.

If the lower limit of the condition (4) is exceeded, the second lens unit $G_2$ which is designed as the movable lens unit will have too strong a refractive power, varies spherical aberration and chromatic aberration remarkably by the movement thereof and produces aberrations in increased amounts in the diverging direction, thereby making it impossible to correct chromatic aberration in the objective lens system as a whole. If the upper limit of the condition (4) is exceeded, the second lens unit $G_2$ will have a weakened refractive power and the refractive power of the third lens unit $G_3$ must be strengthened in the positive direction for focusing the diverging light bundle coming from the first lens unit $G_1$ onto a predetermined location. Accordingly, the negative refractive power of the third lens unit $G_3$ will be weakened and Petzval's sum of the objective lens system will be enlarged. Further, aberrations such as chromatic aberration, coma and astigmatism will be unbalanced, thereby making it difficult to correct the aberrations produced due to the variations of the thickness of the cover glass plates.

It is necessary to use at least one cemented surface having a negative refractive power in the second lens unit $G_2$ which is moved for correcting the variations of aberrations caused by the variation of the thickness of the cover glass plate. The variations of aberrations can be corrected more favorably by designing this cemented surface so as to satisfy the following condition (5):

$$(5) \; 0.02 < \{(n_N - n_p)/r_c\} f < 0.13 \tag{5}$$

wherein the reference symbol $r_c$ represents the radius of curvature of said cemented surface having the negative refractive power, and the reference symbols $n_N$ and $n_p$ designate the refractive indices of a negative lens element and a positive lens element respectively which are arranged before and after said cemented surface.

If the lower limit of the condition (5) is exceeded, the negative refractive power of the cemented surface will be weakened and aberrations will be produced in reduced amounts in the diverging direction, thereby making it impossible to correct spherical aberration and chromatic aberration when the thickness of the cover glass plate is varied. If the upper limit of the condition (5) is exceeded, the second lens unit $G_2$ will have a strengthened diverging function, and produce spherical aberration and chromatic aberration in the diverging direction. Accordingly, the converging function of the third lens unit $G_3$ must be strengthened and the variations of the thickness of the cover glasses plate will produce more remarkable variations of aberrations, thereby making it impossible to obtain sufficiently favorable performance of the objective lens system.

DETAILED DESCRIPTION OF THE PREFERRED EMBODIMENTS

Now, the present invention will be described more detailedly below with reference to the preferred embodiments shown in the accompanying drawings and given in the form of the following numerical data:

Embodiment 1
$f = 1.54$, $d_0 = 1.065$ $r_1 = -9.84$
$d_1 = 2.1$   $n_1 = 1.755$   $\nu_1 = 52.33$
$r_2 = -3.13$
$d_2 = 0.16$
$r_3 = 8.39$
$d_3 = 3.2$   $n_2 = 1.456$   $\nu_2 = 90.31$
$r_4 = -4.76$
$d_4 = 0.8$   $n_3 = 1.6134$   $\nu_3 = 43.84$
$r_5 = 15.12$
$d_5$ (variable)
$r_6 = 15.29$
$d_6 = 1.05$   $n_4 = 1.6968$   $\nu_4 = 56.49$
$r_7 = 8.48$
$d_7 = 4.32$   $n_5 = 1.456$   $\nu_5 = 90.31$
$r_8 = -9.42$
$d_8 = 0.25$
$r_9 = 73.13$
$d_9 = 2.3$   $n_6 = 1.43389$   $\nu_6 = 95.15$
$r_{10} = -14.92$
$d_{10} = 0.25$
$r_{11} = 21.81$
$d_{11} = 3.39$   $n_7 = 1.43389$   $\nu_7 = 95.15$ -continued
Embodiment 1

$r_{12} = -8.3$
$d_{12} = 1.1$   $n_8 = 1.883$   $\nu_8 = 40.78$
$r_{13} = -88.45$
$d_{13} = 0.15$
$r_{14} = 12.64$
$d_{14} = 7$   $n_9 = 1.618$   $\nu_9 = 63.38$
$r_{15} = -7.21$
$d_{15} = 3.13$   $n_{10} = 1.53375$   $\nu_{10} = 55.52$
$r_{16} = 8.06$
$d_{16}$ (variable)
$r_{17} = 6.56$
$d_{17} = 3.59$   $n_{11} = 1.7847$   $\nu_{11} = 26.22$
$r_{18} = -6.13$
$d_{18} = 3.19$   $n_{12} = 1.74$   $\nu_{12} = 31.7$
$r_{19} = 4.58$
$d_{19} = 1.39$
$r_{20} = -2.59$
$d_{20} = 0.7$   $n_{13} = 1.84666$   $\nu_{13} = 23.78$
$r_{21} = -5.38$ $r_i(=r_5)/f = 9.8$   $f_1/f = 3.09$
$f_2/f = 5.45$   $\{(n_4-n_5)/r_7\}f = 0.044$
$\{(n_8-n_7)/r_{12}\}f = 0.083$

| t | $d_0$ | $d_5$ | $d_{16}$ |
|---|---|---|---|
| 0.7 | 1.164 | 2.57 | 3.99 |
| 1.1 | 1.065 | 1.9 | 4.66 |
| 1.5 | 0.974 | 1.08 | 5.49 |

Embodiment 2
$f = 1.54$, $d_0 = 1.22$ $r_1 = -8.17$
$d_1 = 2.1$   $n_1 = 1.755$   $\nu_1 = 52.33$
$r_2 = -3.17$
$d_2 = 0.16$
$r_3 = 9.3$
$d_3 = 3$   $n_2 = 1.456$   $\nu_2 = 90.31$
$r_4 = -5.38$
$d_4 = 0.8$   $n_3 = 1.6134$   $\nu_3 = 43.84$
$r_5 = 18.99$
$d_5$ (variable)
$r_6 = 12.85$
$d_6 = 1.05$   $n_4 = 1.72916$   $\nu_4 = 54.68$
$r_7 = 7.61$
$d_7 = 4.32$   $n_5 = 1.456$   $\nu_5 = 90.31$
$r_8 = -9.35$
$d_8 = 0.4$
$r_9 = 15.32$
$d_9 = 1.1$   $n_6 = 1.7865$   $\nu_6 = 50$
$r_{10} = 7.61$
$d_{10} = 5$   $n_7 = 1.456$   $\nu_7 = 90.31$
$r_{11} = -8.38$
$d_{11} = -1.1$   $n_8 = 1.883$   $\nu_8 = 40.78$
$r_{12} = -22.85$
$d_{12} = 0.2$
$r_{13} = 34.48$
$d_{13} = 2.2$   $n_9 = 1.456$   $\nu_9 = 90.31$
$r_{14} = -50.55$
$d_{14} = 0.2$
$r_{15} = 12.36$
$d_{15} = 6.5$   $n_{10} = 1.56907$   $\nu_{10} = 71.3$
$r_{16} = -6.41$
$d_{16} = 2.26$   $n_{11} = 1.53375$   $\nu_{11} = 55.52$
$r_{17} = 7.15$
$d_{17}$ (variable)
$r_{18} = 5.7$
$d_{18} = 3.76$   $n_{12} = 1.7847$   $\nu_{12} = 26.22$
$r_{19} = -8.32$
$d_{19} = 2.81$   $n_{13} = 1.74$   $\nu_{13} = 31.7$
$r_{20} = 3.21$
$d_{20} = 1.39$
$r_{21} = -2.2$
$d_{21} = 0.7$   $n_{14} = 1.84666$   $\nu_{14} = 23.78$
$r_{22} = -4.06$ $r_i(=r_5)/f = 12.4$   $f_1/f = 3.42$
$f_2/f = 6.06$   $\{(n_4-n_5)/r_7\}f = 0.055$
$\{(n_6-n_7)/r_{10}\}f = 0.067$

-continued

Embodiment 2

$\{(n_8-n_7)/r_{11}\}f = 0.078$

| t | $d_0$ | $d_5$ | $d_{17}$ |
|---|---|---|---|
| 0.7 | 1.333 | 2.59 | 2.47 |
| 1.1 | 1.22 | 1.9 | 3.16 |
| 1.5 | 1.119 | 1.06 | 4 |

Embodiment 3

$f = 1.54$, $d_0 = 1.276$

| | | | |
|---|---|---|---|
| $r_1 = -8.23$ | | | |
| | $d_1 = 2.1$ | $n_1 = 1.755$ | $\nu_1 = 52.33$ |
| $r_2 = -3.2$ | | | |
| | $d_2 = 0.16$ | | |
| $r_3 = 9.17$ | | | |
| | $d_3 = 3.1$ | $n_2 = 1.456$ | $\nu_2 = 90.31$ |
| $r_4 = -5.4$ | | | |
| | $d_4 = 0.8$ | $n_3 = 1.6134$ | $\nu_3 = 43.84$ |
| $r_5 = 18.51$ | | | |
| | $d_5$ (variable) | | |
| $r_6 = 13.39$ | | | |
| | $d_6 = 1.05$ | $n_4 = 1.6968$ | $\nu_4 = 56.49$ |
| $r_7 = 7.7$ | | | |
| | $d_7 = 4.32$ | $n_5 = 1.456$ | $\nu_5 = 90.31$ |
| $r_8 = -10.51$ | | | |
| | $d_8 = 0.1$ | | |
| $r_9 = 26.46$ | | | |
| | $d_9 = 1.1$ | $n_6 = 1.6968$ | $\nu_6 = 56.49$ |
| $r_{10} = 8.78$ | | | |
| | $d_{10} = 3.39$ | $n_7 = 1.497$ | $\nu_7 = 81.61$ |
| $r_{11} = -16.68$ | | | |
| | $d_{11} = 0.1$ | | |
| $r_{12} = 15.83$ | | | |
| | $d_{12} = 3.39$ | $n_8 = 1.456$ | $\nu_8 = 90.31$ |
| $r_{13} = -9.52$ | | | |
| | $d_{13} = 1.1$ | $n_9 = 1.883$ | $\nu_9 = 40.78$ |
| $r_{14} = 109.35$ | | | |
| | $d_{14} = 0.15$ | | |
| $r_{15} = 15.66$ | | | |
| | $d_{15} = 7$ | $n_{10} = 1.618$ | $\nu_{10} = 63.38$ |
| $r_{16} = -6.11$ | | | |
| | $d_{16} = 2.37$ | $n_{11} = 1.53375$ | $\nu_{11} = 55.52$ |
| $r_{17} = 9.98$ | | | |
| | $d_{17}$ (variable) | | |
| $r_{18} = 5.81$ | | | |
| | $d_{18} = 3.47$ | $n_{12} = 1.7847$ | $\nu_{12} = 26.22$ |
| $r_{19} = -9.2$ | | | |
| | $d_{19} = 3.04$ | $n_{13} = 1.74$ | $\nu_{13} = 31.7$ |
| $r_{20} = 3.28$ | | | |
| | $d_{20} = 1.39$ | | |
| $r_{21} = -2.19$ | | | |
| | $d_{21} = 0.7$ | $n_{14} = 1.84666$ | $\nu_{14} = 23.78$ |
| $r_{22} = -3.96$ | | | |

$r_f(=r_5)/f = 12.1$  $f_1/f = 3.44$
$f_2/f = 6.05$  $\{(n_4-n_5)/r_7\}f = 0.048$
$\{(n_6-n_7)/r_{10}\}f = 0.035$
$\{(n_9-n_8)/r_{13}\}f = 0.069$

| t | $d_0$ | $d_5$ | $d_{17}$ |
|---|---|---|---|
| 0.7 | 1.398 | 2.56 | 3.07 |
| 1.1 | 1.276 | 1.9 | 3.73 |
| 1.5 | 1.166 | 1.1 | 4.53 |

Embodiment 4

$f = 1.54$, $d_0 = 1.08$

| | | | |
|---|---|---|---|
| $r_1 = -7.34$ | | | |
| | $d_1 = 2.1$ | $n_1 = 1.6968$ | $\nu_1 = 56.49$ |
| $r_2 = -2.92$ | | | |
| | $d_2 = 0.16$ | | |
| $r_3 = 13.37$ | | | |
| | $d_3 = 2.35$ | $n_2 = 1.43389$ | $\nu_2 = 95.15$ |
| $r_4 = -6.92$ | | | |
| | $d_4 = 0.8$ | $n_3 = 1.72916$ | $\nu_3 = 54.68$ |
| $r_5 = -200$ | | | |
| | $d_5$ (variable) | | |
| $r_6 = 13.04$ | | | |
| | $d_6 = 1.05$ | $n_4 = 1.72916$ | $\nu_4 = 54.68$ |
| $r_7 = 7.84$ | | | |
| | $d_7 = 4.32$ | $n_5 = 1.43389$ | $\nu_5 = 95.15$ |
| $r_8 = -9.65$ | | | |
| | $d_8 = 0.4$ | | |
| $r_9 = 31.98$ | | | |
| | $d_9 = 1.1$ | $n_6 = 1.72916$ | $\nu_6 = 54.68$ |
| $r_{10} = 8.82$ | | | |
| | $d_{10} = 3.39$ | $n_7 = 1.456$ | $\nu_7 = 90.31$ |
| $r_{11} = -15.69$ | | | |
| | $d_{11} = 0.1$ | | |
| $r_{12} = 35.18$ | | | |
| | $d_{12} = 3.39$ | $n_8 = 1.456$ | $\nu_8 = 90.31$ |
| $r_{13} = -9.31$ | | | |
| | $d_{13} = 1.1$ | $n_9 = 1.883$ | $\nu_9 = 40.78$ |
| $r_{14} = -38.3$ | | | |
| | $d_{14} = 0.15$ | | |
| $r_{15} = 8.65$ | | | |
| | $d_{15} = 7$ | $n_{10} = 1.56907$ | $\nu_{10} = 71.3$ |
| $r_{16} = -5.66$ | | | |
| | $d_{16} = 2.82$ | $n_{11} = 1.56384$ | $\nu_{11} = 60.69$ |
| $r_{17} = 5.37$ | | | |
| | $d_{17}$ (variable) | | |
| $r_{18} = 5.36$ | | | |
| | $d_{18} = 3.48$ | $n_{12} = 1.7552$ | $\nu_{12} = 27.51$ |
| $r_{19} = 33.53$ | | | |
| | $d_{19} = 2.86$ | $n_{13} = 1.6765$ | $\nu_{13} = 37.5$ |
| $r_{20} = 3.68$ | | | |
| | $d_{20} = 1.39$ | | |
| $r_{21} = -2.3$ | | | |
| | $d_{21} = 0.7$ | $n_{14} = 1.80518$ | $\nu_{14} = 25.43$ |
| $r_{22} = -4.13$ | | | |

$|r_f(=r_5)|/f = 130.1$  $f_1/f = 3.66$
$f_2/f = 5.37$  $\{(n_4-n_5)/r_7\}f = 0.058$
$\{(n_6-n_7)/r_{10}\}f = 0.048$
$\{(n_9-n_8)/r_{13}\}f = 0.071$

| t | $d_0$ | $d_5$ | $d_{17}$ |
|---|---|---|---|
| 0.7 | 1.193 | 2.48 | 3.7 |
| 1.1 | 1.08 | 1.8 | 4.37 |
| 1.5 | 0.977 | 0.98 | 5.19 |

Embodiment 5

$f = 1.54$, $d_0 = 1.515$

| | | | |
|---|---|---|---|
| $r_1 = -6.83$ | | | |
| | $d_1 = 2.29$ | $n_1 = 1.7865$ | $\nu_1 = 50$ |
| $r_2 = -3.47$ | | | |
| | $d_2 = 0.2$ | | |
| $r_3 = 10.99$ | | | |
| | $d_3 = 2.3$ | $n_2 = 1.456$ | $\nu_2 = 90.31$ |
| $r_4 = -12.53$ | | | |
| | $d_4 = 0.85$ | $n_3 = 1.72916$ | $\nu_3 = 54.68$ |
| $r_5 = 31.99$ | | | |
| | $d_5$ (variable) | | |
| $r_6 = 12.1$ | | | |
| | $d_6 = 1.1$ | $n_4 = 1.7865$ | $\nu_4 = 50$ |
| $r_7 = 7.57$ | | | |
| | $d_7 = 4.27$ | $n_5 = 1.43425$ | $\nu_5 = 95$ |
| $r_8 = -10.31$ | | | |
| | $d_8 = 0.5$ | | |
| $r_9 = 12.97$ | | | |
| | $d_9 = 1.1$ | $n_6 = 1.7865$ | $\nu_6 = 50$ |
| $r_{10} = 7.8$ | | | |
| | $d_{10} = 3.8$ | $n_7 = 1.43425$ | $\nu_7 = 95$ |
| $r_{11} = -16.71$ | | | |
| | $d_{11} = 0.15$ | | |
| $r_{12} = 11.1$ | | | |
| | $d_{12} = 3.2$ | $n_8 = 1.456$ | $\nu_8 = 90.31$ |
| $r_{13} = -9.06$ | | | |
| | $d_{13} = 1$ | $n_9 = 1.874$ | $\nu_9 = 35.26$ |
| $r_{14} = 196.89$ | | | |
| | $d_{14} = 1.3$ | | |
| $r_{15} = -18.98$ | | | |

-continued

Embodiment 5

| | | | |
|---|---|---|---|
| $r_{16} = -4.97$ | $d_{15} = 3.1$ | $n_{10} = 1.618$ | $\nu_{10} = 63.38$ |
| $r_{17} = 53.97$ | $d_{16} = 1.03$ | $n_{11} = 1.5213$ | $\nu_{11} = 52.55$ |
| $r_{18} = 4.83$ | $d_{17}$ (variable) | | |
| $r_{19} = 83.77$ | $d_{18} = 2.7$ | $n_{12} = 1.80518$ | $\nu_{12} = 25.43$ |
| $r_{20} = 2.65$ | $d_{19} = 2.01$ | $n_{13} = 1.74$ | $\nu_{13} = 31.7$ |
| $r_{21} = -2.29$ | $d_{20} = 1.7$ | | |
| $r_{22} = -4.08$ | $d_{21} = 0.7$ | $n_{14} = 1.7847$ | $\nu_{14} = 26.22$ |

$r_i(=r_5)/f = 20.8 \quad\quad f_1/f = 4.14$
$f_2/f = 6.98 \quad\quad \{(n_4-n_5)/r_7\}f = 0.072$
$\{(n_6-n_7)/r_{10}\}f = 0.07$
$\{(n_9-n_8)/r_{13}\}f = 0.071$

| t | $d_0$ | $d_5$ | $d_{17}$ |
|---|---|---|---|
| 0.9 | 1.618 | 2.31 | 8.52 |
| 1.2 | 1.515 | 1.8 | 9.03 |
| 1.5 | 1.418 | 1.21 | 9.62 | wherein the reference symbols $r_1, r_2, \ldots$ represent radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, the reference symbols $\gamma_1, \gamma_2, \ldots$ represent Abbe's numbers of the respective lens elements, the reference symbol $d_0$ designates the working distance of the objective lens system, and the reference symbol t denotes the thickness of the cover glass plate.

The Embodiments 1 through 5 have the compositions illustrated in FIG. 1 through FIG. 5 respectively. In each of these embodiments, the second lens unit $G_2$ is moved for the distance specified in the numerical data in conjunction with thickness of the cover glass plate.

Out of these embodiments, the Embodiments 1 through 3 are designed on an assumption that cultivation dishes made of glass are to be used as the cover glass plates. The cultivation dish made of glass has a refractive index of 1.52287 for the d-line and an Abbe's number of 59.89.

Further, the Embodiments 4 and 5 are designed on an assumption that cultivation dishes made of a plastic material (polystyrene) are to be used as the cover glass plates. Polystyrene has a refractive index of 1.59108 for the d-line and an Abbe's number of 30.85.

The Embodiments 1 through 4 are designed for a variation range from 0.7 to 1.5 mm of thickness of the cover glass plate, whereas the Embodiment 5 is designed for a variation range from 0.9 to 1.5 mm of thickness of the cover glass plate. Further, all of the Embodiments 1 through 5 have a magnification of ×100, an NA of 0.8 and an image height of 10.5 mm.

Figure 1:
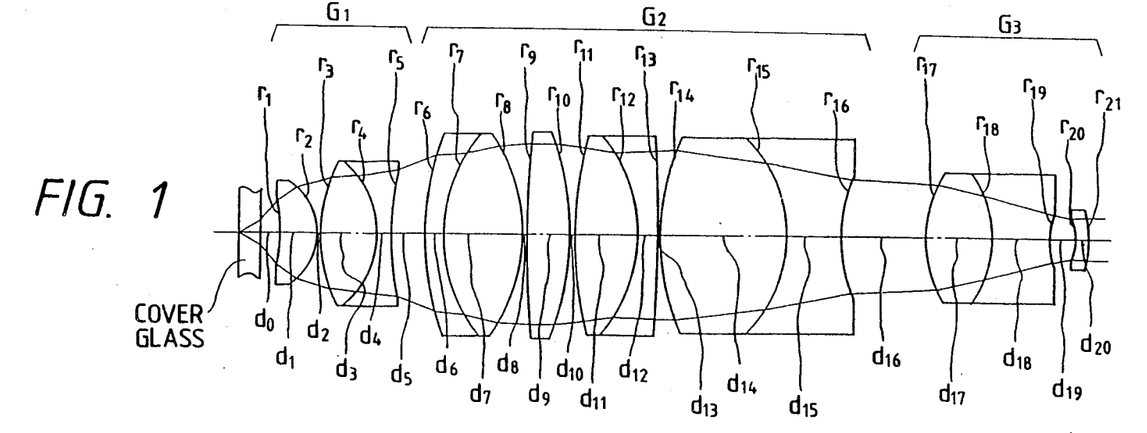
FIG. 1 through FIG. 5 show sectional views illustrating compositions of Embodiments 1 through 5 respectively of the objective lens system for microscopes according to the present invention.
Figure 2:
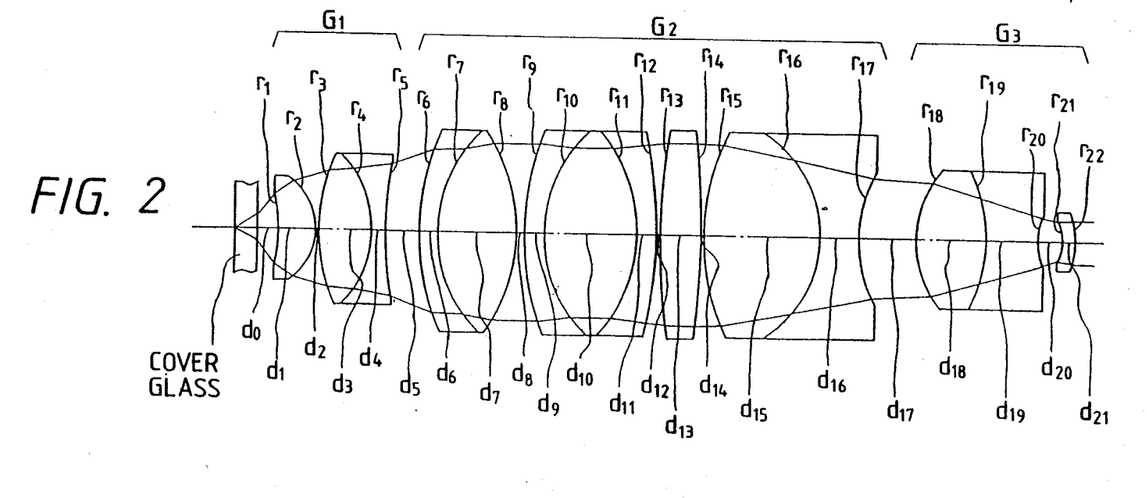
Figure 3:
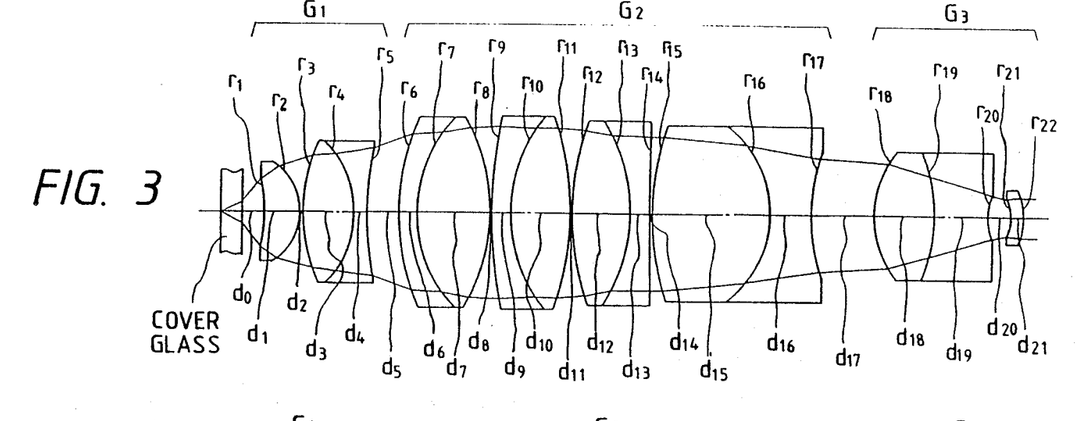
Figure 4:
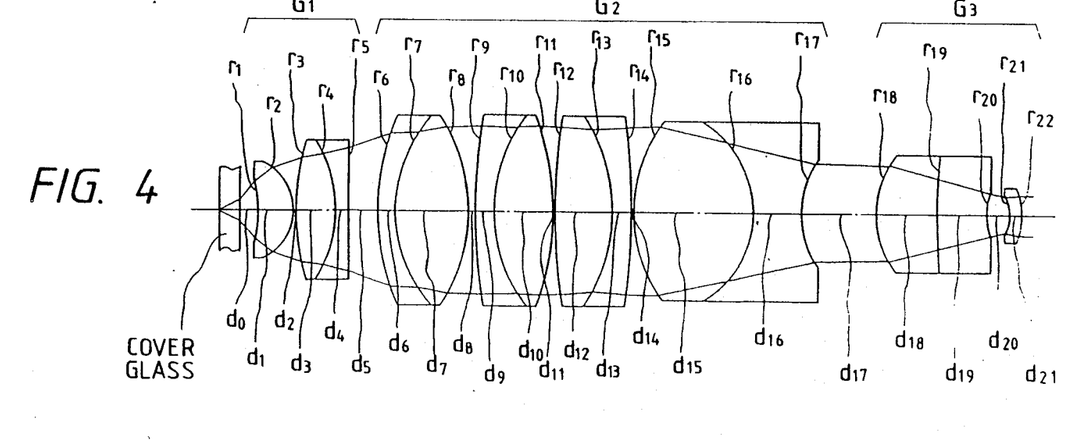
Figure 5:
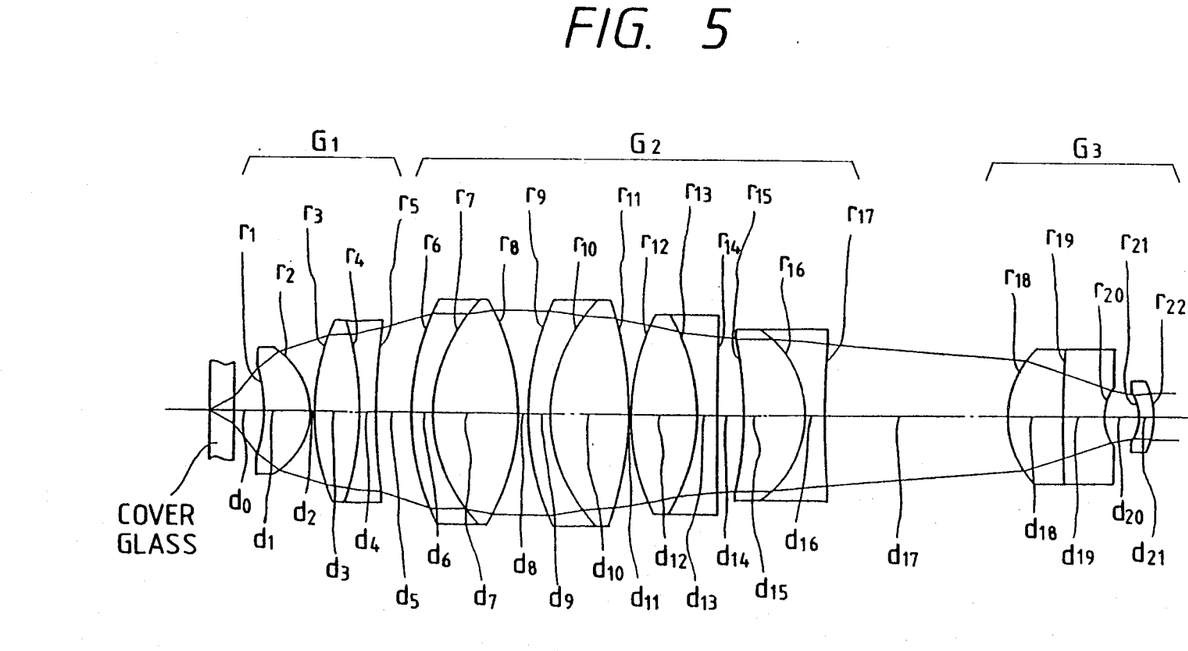
Figure 6:
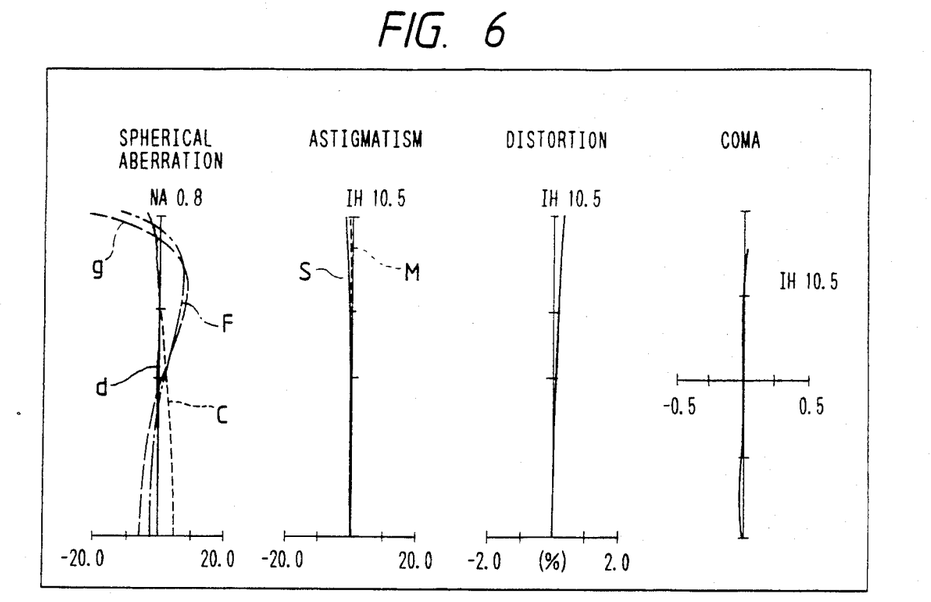
FIG. 6 through FIG. 8 show curves illustrating aberration characteristics of the Embodiment 1 of the present invention.
Figure 7:
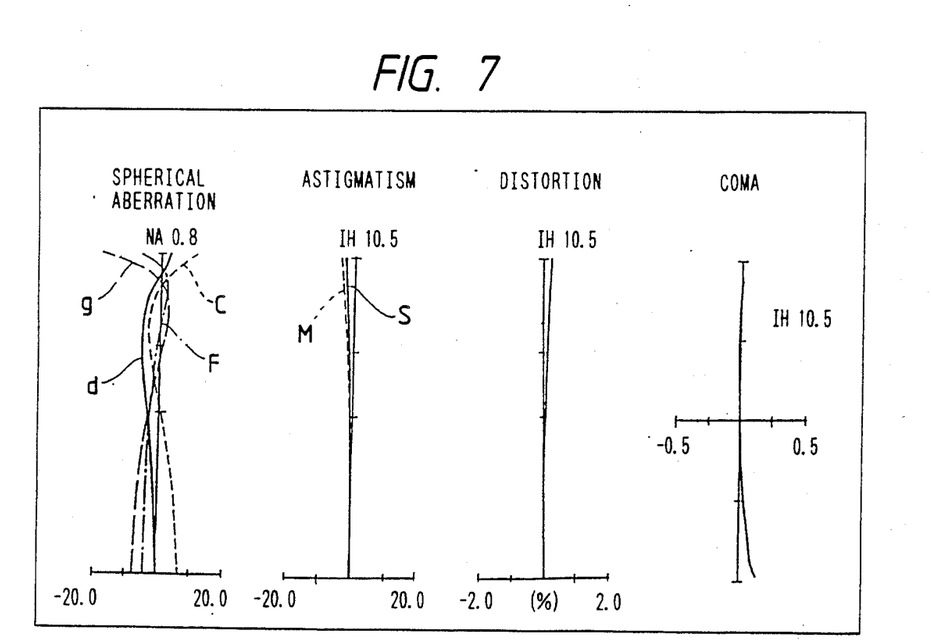
Figure 8:
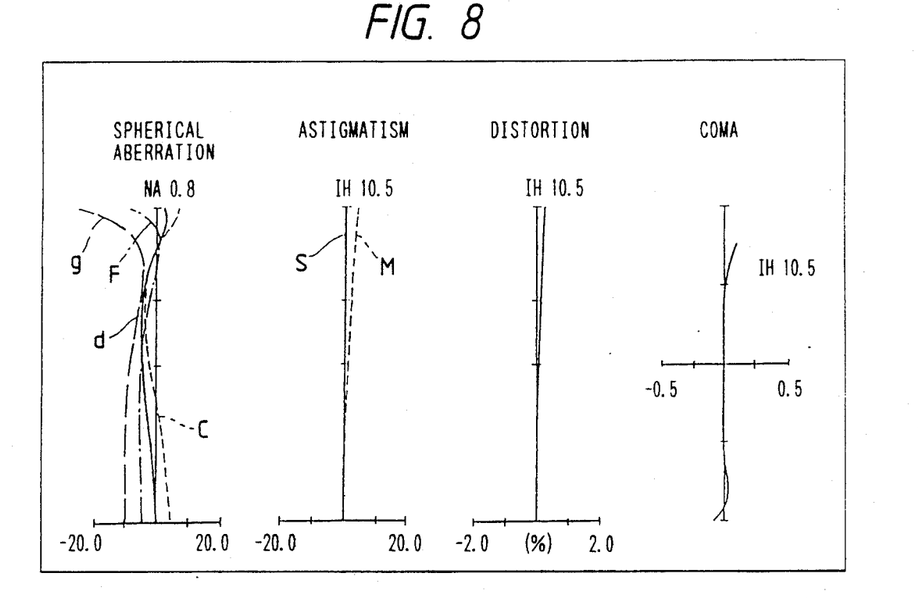

Aberration characteristics of the Embodiment 1 used with cover glass plates 0.7 mm, 1.1 mm and 1.5 mm thick are illustrated in FIG. 6, FIG. 7 and FIG. 8 respectively.

Figure 9:
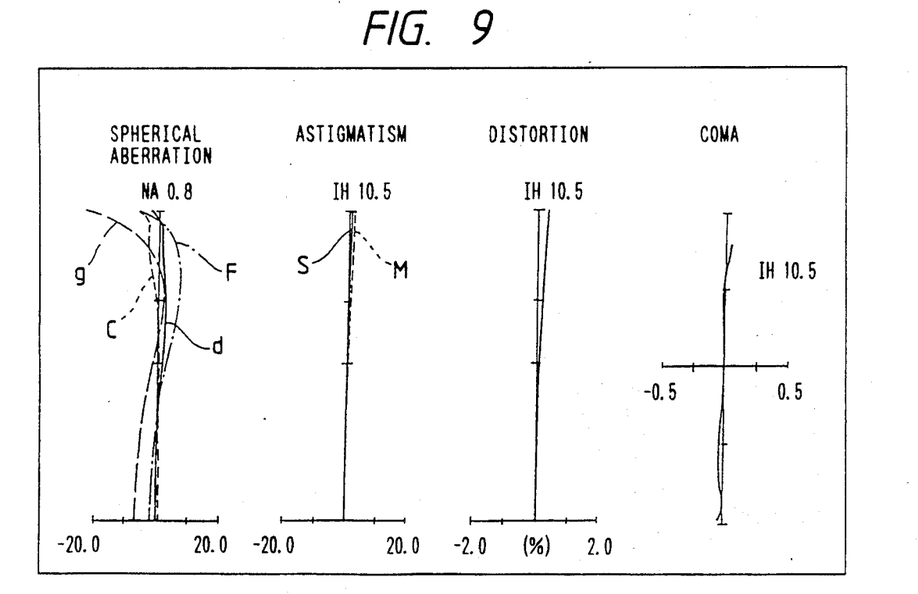
FIG. 9 through FIG. 11 show curves illustrating aberration characteristics of the Embodiment 2 of the present invention.
Figure 10:
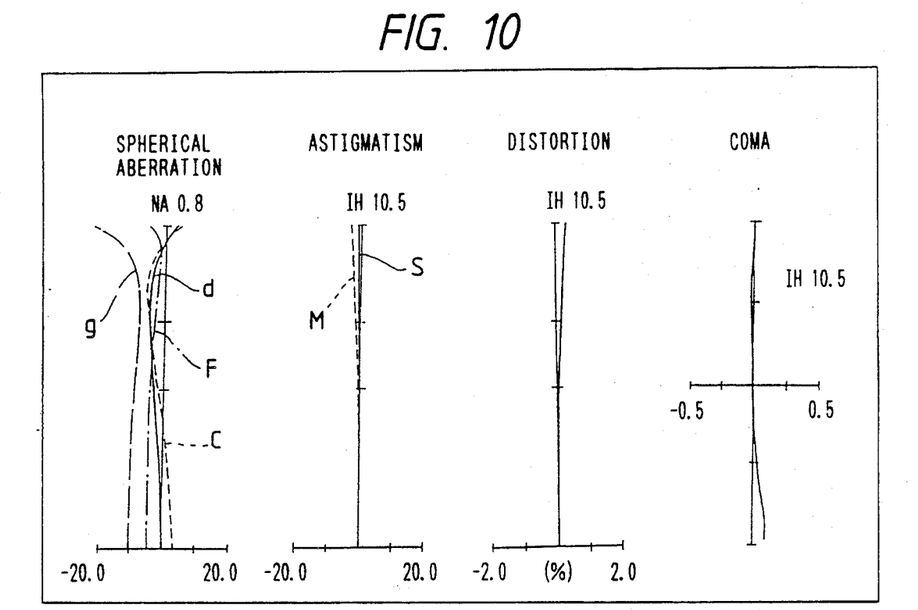
Figure 11:
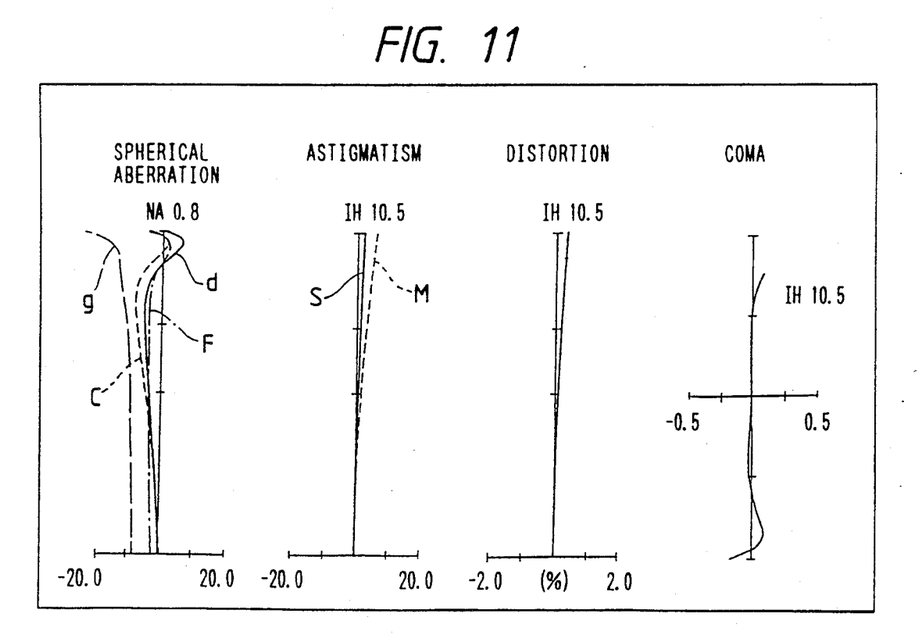

Aberration characteristics of the Embodiment 2 used with cover glass plates 0.7 mm, 1.1 mm, and 1.5 mm thick are illustrated in FIG. 9, FIG. 10 and FIG. 11 respectively.

Figure 12:
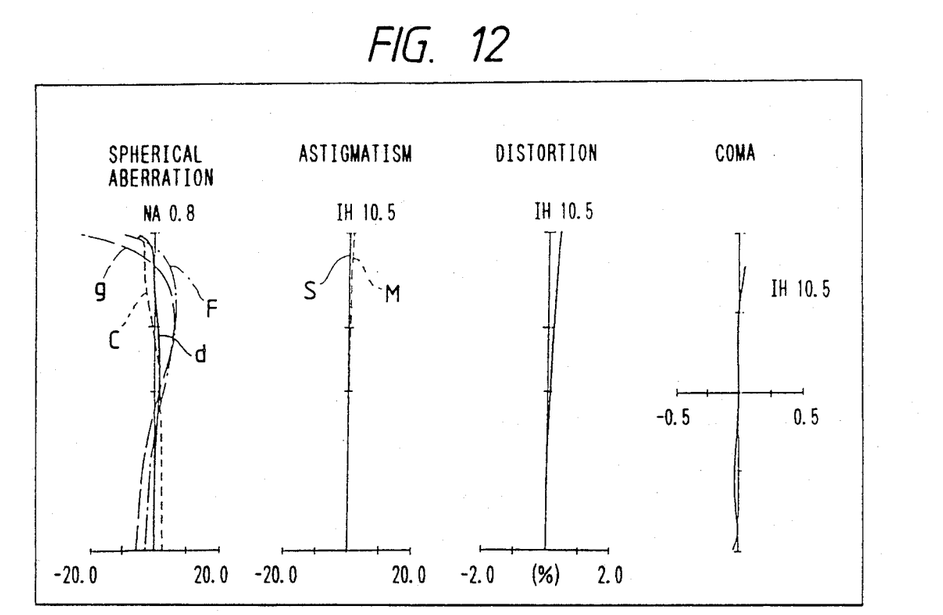
FIG. 12 through FIG. 14 show graphs illustrating aberration characteristics of the Embodiment 3 of the present invention.
Figure 13:
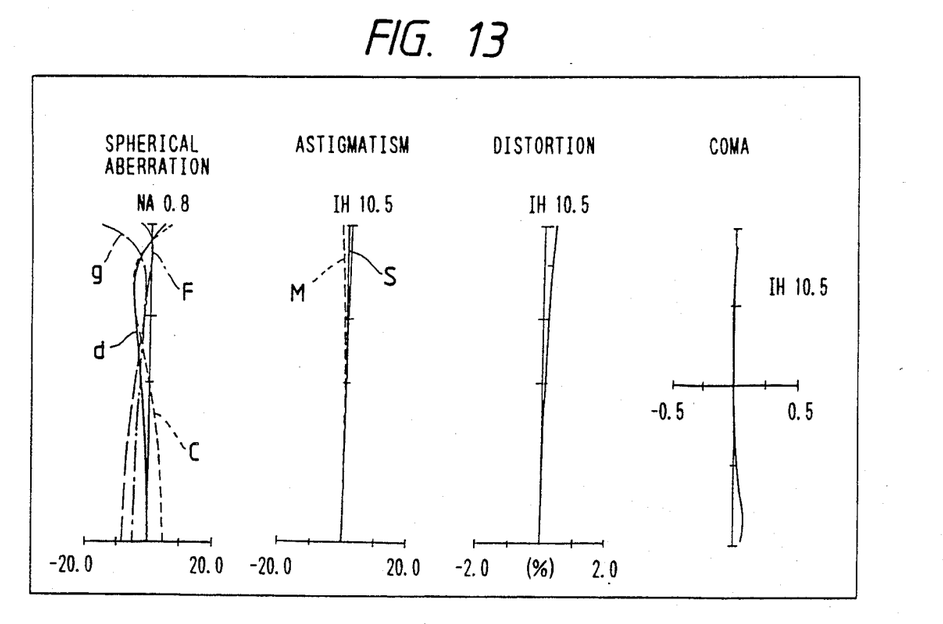
Figure 14:
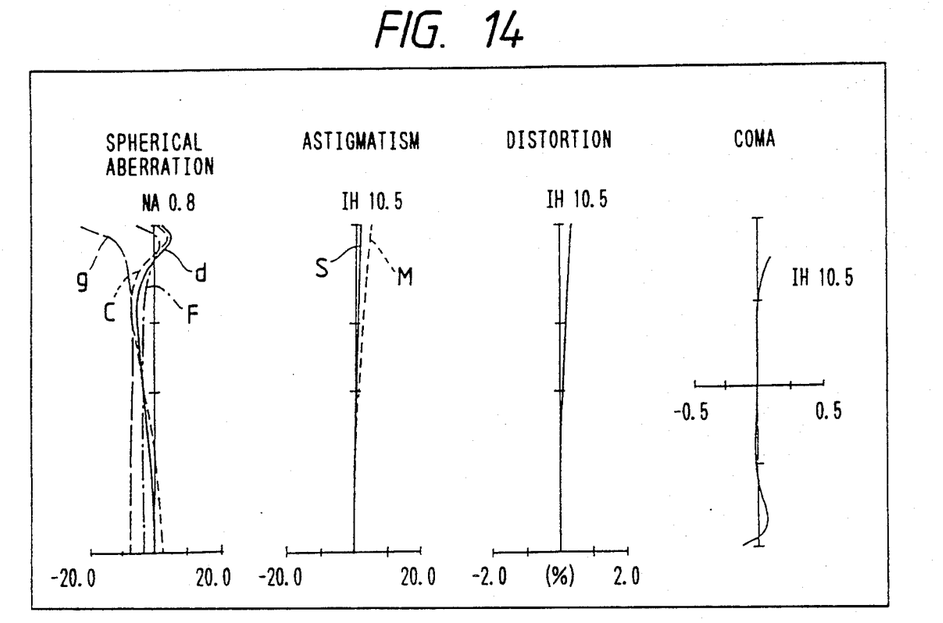

Aberration characteristics of the Embodiment 3 used with cover glass plates 0.7 mm, 1.1 mm and 1.5 mm thick are visualized in FIG. 12, FIG. 13 and FIG. 14 respectively.

Figure 15:
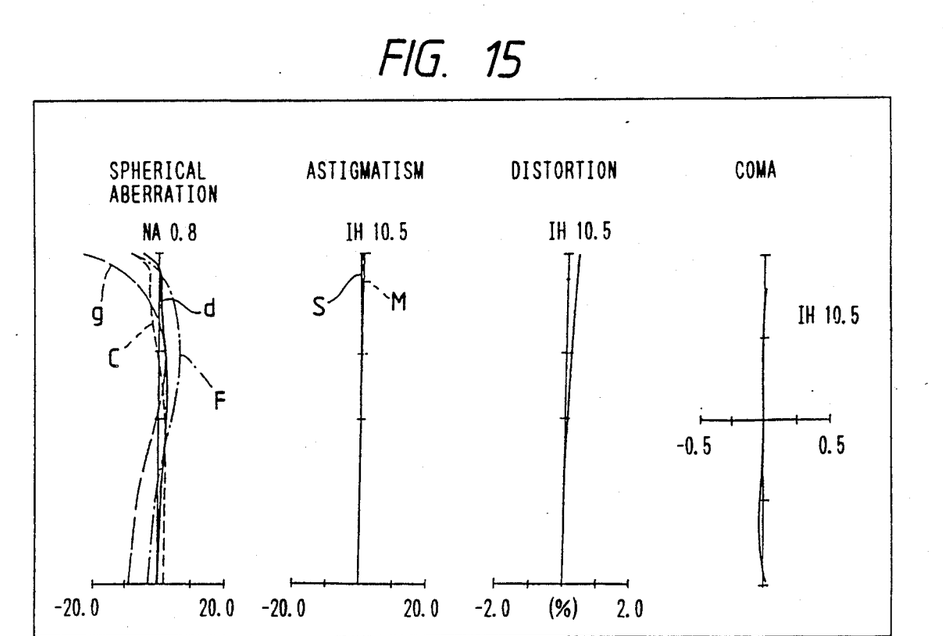
FIG. 15 through FIG. 17 show graphs illustrating aberration characteristics of the Embodiment 4 of the present invention.
Figure 16:
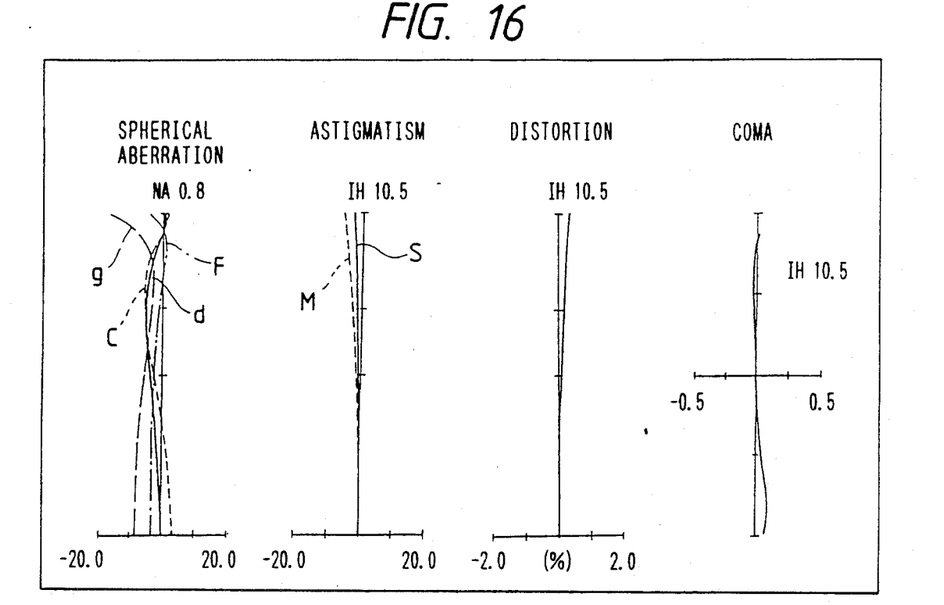
Figure 17:
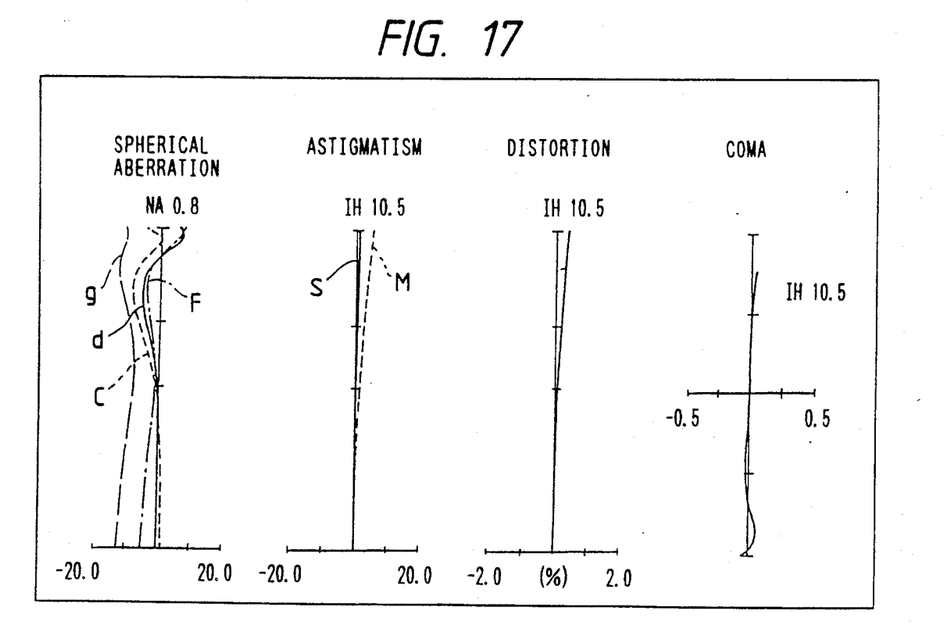

Aberration characteristics of the Embodiment 4 used with cover glass plates 0.7 mm, 1.1 mm and 1.5 mm thick are visualized in FIG. 15, FIG. 16 and FIG. 17 respectively.

Figure 18:
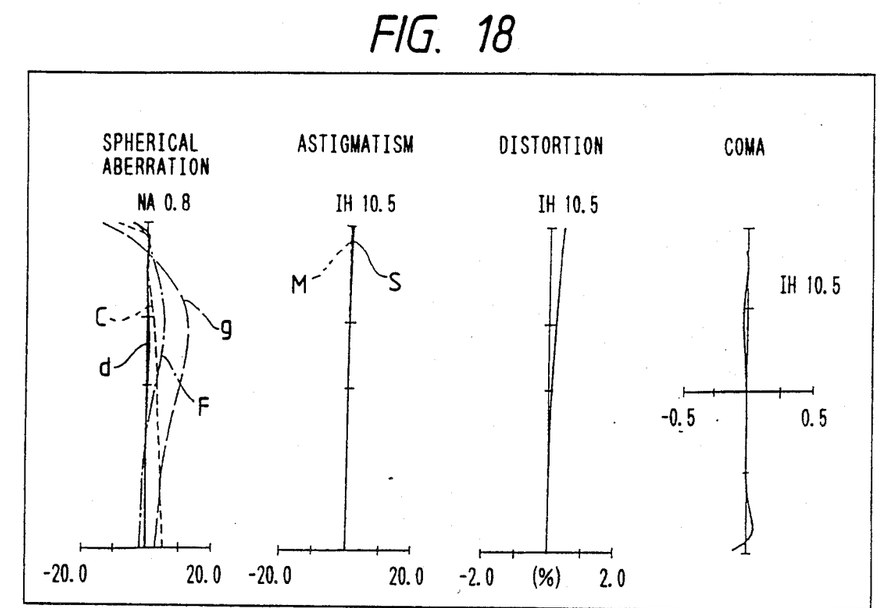
FIG. 18 through FIG. 20 show curves illustrating aberration characteristics of the Embodiment 5 of the present invention.
Figure 19:
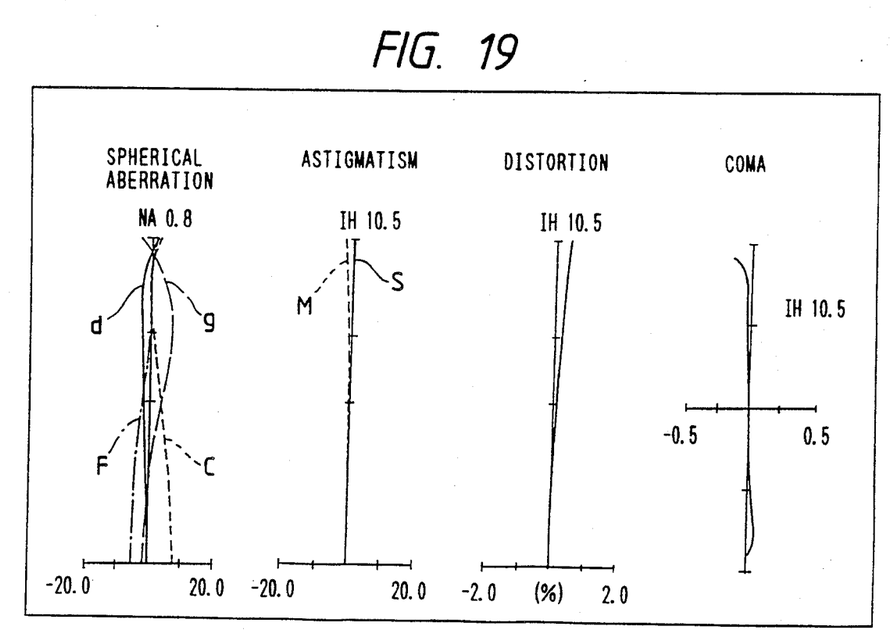
Figure 20:
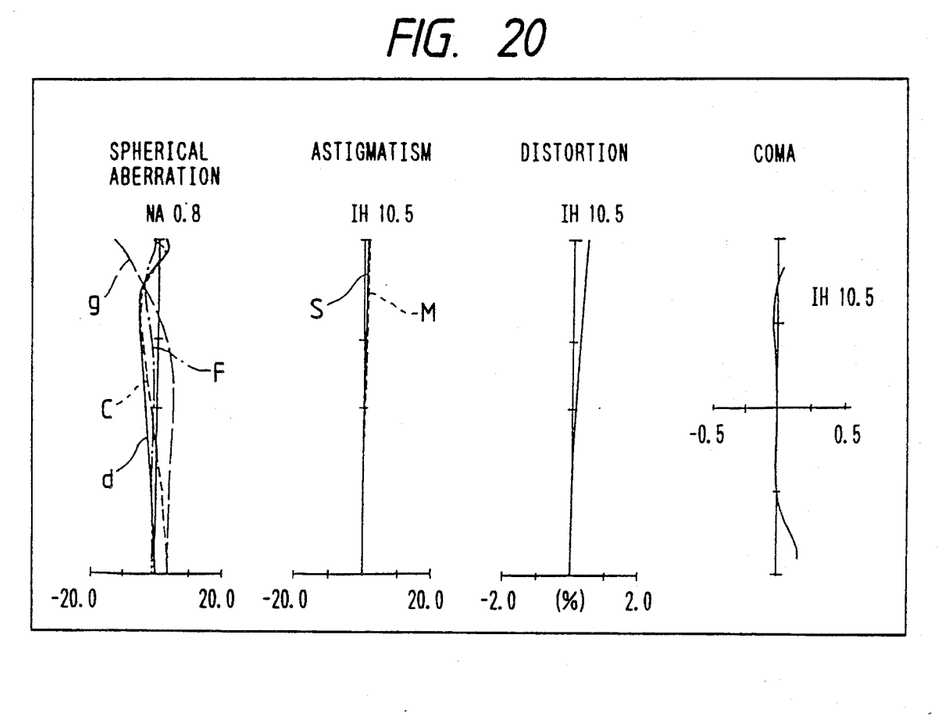

Aberration characteristics of the Embodiment 5 used with cover glass plate 0.9 mm, 1.2 mm and 1.5 mm thick are illustrated in FIG. 18, FIG. 19 and FIG. 20 respectively.

The objective lens system for microscopes according to the present invention is composed as described above, adapted so as to be capable of favorably correcting aberrations produced due to variation of thickness of cover glass plates by moving the second lens unit along the optical axis, and has a high magnification and a large NA.

I claim:

1. An objective lens system for microscopes comprising, in the order from the object side, a first positive lens unit having a positive refractive power, comprising a positive meniscus lens component having a concave surface on the image side and allowing a diverging light bundle to emerge therefrom, a second lens unit having a positive refractive power and movable along the optical axis, and a third lens unit having a negative refractive power, and adapted so as to correct aggravation of aberrations in conjunction with thickness of a plane parallel plate interposed between said first lens unit and an object to be observed by moving said second lens unit along the optical axis relatively to said first lens unit and said third lens unit.

2. An objective lens system for microscopes according to claim 1 wherein said second lens unit has a refractive power weaker than that of said first lens unit.

3. An objective lens system for microscopes according to claim 2 wherein said second lens unit comprises a cemented lens component comprising a cemented surface having a negative refractive power.

4. An objective lens system for microscopes according to claim 3 satisfying the following condition (1):

$$|r_i|/f > 6.5 \quad r_i > 0 \quad\quad (1)$$

wherein the reference symbol $r_i$ represents the radius of curvature on the most image side surface of said first lens unit and the reference symbol f designates the focal length of the objective lens system as a whole.

5. An objective lens system for microscopes according to claim 3 satisfying the following condition (2):

$$|r_i|/f > 50 \quad r_i < 0 \quad\quad (2)$$

wherein the reference symbol $r_i$ represents the radius of curvature on the most image side surface of said first lens unit and the reference symbol f designates the focal length of the objective lens system as a whole.

6. An objective lens system for microscopes according to claim 4 satisfying the following conditions (3) and (4):

$$2 > f_1/f > 6 \quad\quad (3)$$

$$4 > f_2/f > 10 \quad\quad (4)$$

wherein the reference symbols $f_1$ and $f_2$ represent the focal lengths of said first lens unit and said second lens unit respectively, and the reference symbol f designates the focal length of the objective lens system as a whole.

7. An objective lens system for microscopes according to claim 4 or 5 satisfying the following condition (5):

$$(5)\ 0.02 < \{(n_N - n_p)/r_c\}f < 0.13 \tag{5}$$

wherein the reference symbol $r_c$ represents the radius of curvature on said cemented surface having the negative refractive power, and the reference symbols $n_p$ and $n_N$ designate the refractive indices of a positive lens component and a negative lens component respectively arranged before and after said cemented surface having the negative refractive power.

8. An objective lens system for microscopes according to claim 1 wherein said first lens unit comprises a positive meniscus lens component having a convex surface on the image side and a cemented lens component having a convex surface on the object side, said second lens component comprises a cemented doublet arranged on the most object side, and another cemented doublet arranged on the most image side and having a concave surface on the image side, and said third lens unit comprises a cemented doublet and a meniscus lens component having concave surfaces opposed to each other.

9. An objective lens system for microscopes according to claim 8 wherein said second lens unit comprises a plurality of cemented lens components.

* * * * *